United States Patent [19]

Lambert et al.

[11] Patent Number: 4,718,222
[45] Date of Patent: Jan. 12, 1988

[54] UNIVERSAL MOWER DECK BOOT

[75] Inventors: Stephen K. Lambert; Dean A. Bliskey, both of Greenville, Ohio

[73] Assignee: Lambert Corporation, Ansonia, Ohio

[21] Appl. No.: 516,496

[22] Filed: Jul. 25, 1983

[51] Int. Cl.⁴ .......................................... A01D 34/48
[52] U.S. Cl. .................... 56/202; 56/320.2; 56/16.6
[58] Field of Search ............. 56/320.2, 202, 17.5, 56/255, 16.6

[56] References Cited

U.S. PATENT DOCUMENTS

| | | | |
|---|---|---|---|
| 3,143,842 | 8/1964 | Mattson et al. | 56/202 |
| 3,197,949 | 8/1965 | Waag | 56/202 |
| 3,494,116 | 2/1970 | Lempke | 56/202 |
| 3,499,275 | 3/1970 | Lozen | 56/202 |
| 3,716,977 | 2/1973 | Jackson | 56/202 |
| 3,822,536 | 7/1974 | Leader | 56/202 |
| 4,142,351 | 3/1979 | Neice et al. | 56/202 |

Primary Examiner—John Weiss
Attorney, Agent, or Firm—Biebel, French & Nauman

[57] ABSTRACT

A universal mower deck discharge boot is formed by rotational molding into two sections which telescope one over the other and each of which is formed with a blank forwardly or side facing wall portion, which wall portions together are adapted to be cut out and formed with an opening which closely conforms to the discharge chute of a mower deck. The forward section is otherwise generally closed at the sides and the top and the bottom and is formed with a curved forward wall to resist catching on obstructions, while the rear section is formed with a discharge spout adapted to receive a flexible conduit. The sections telescope one relative to the other to conform to the dimensions of a wide variety of mower deck discharge chutes.

3 Claims, 7 Drawing Figures

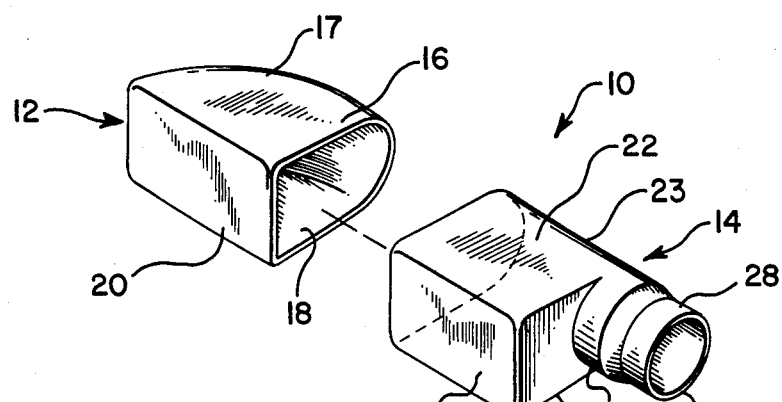
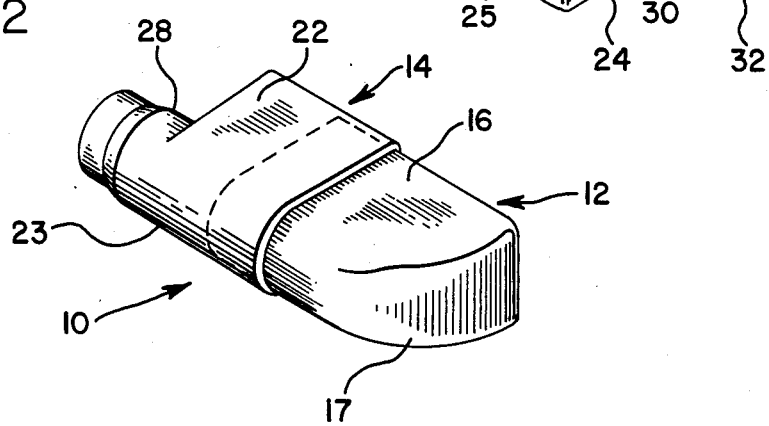
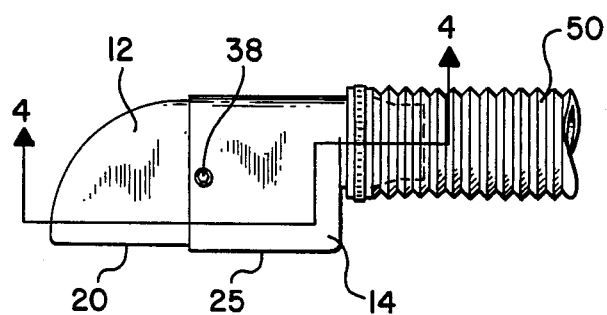
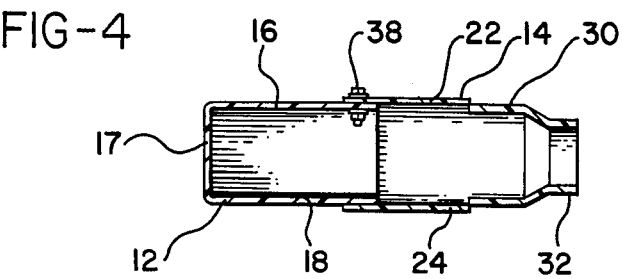

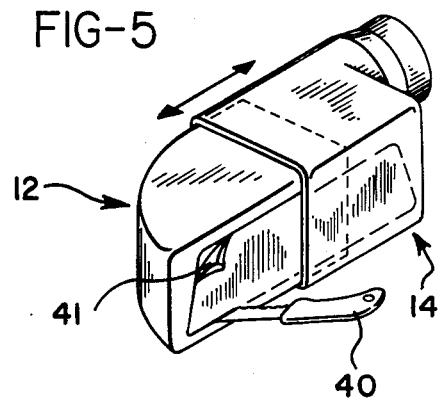
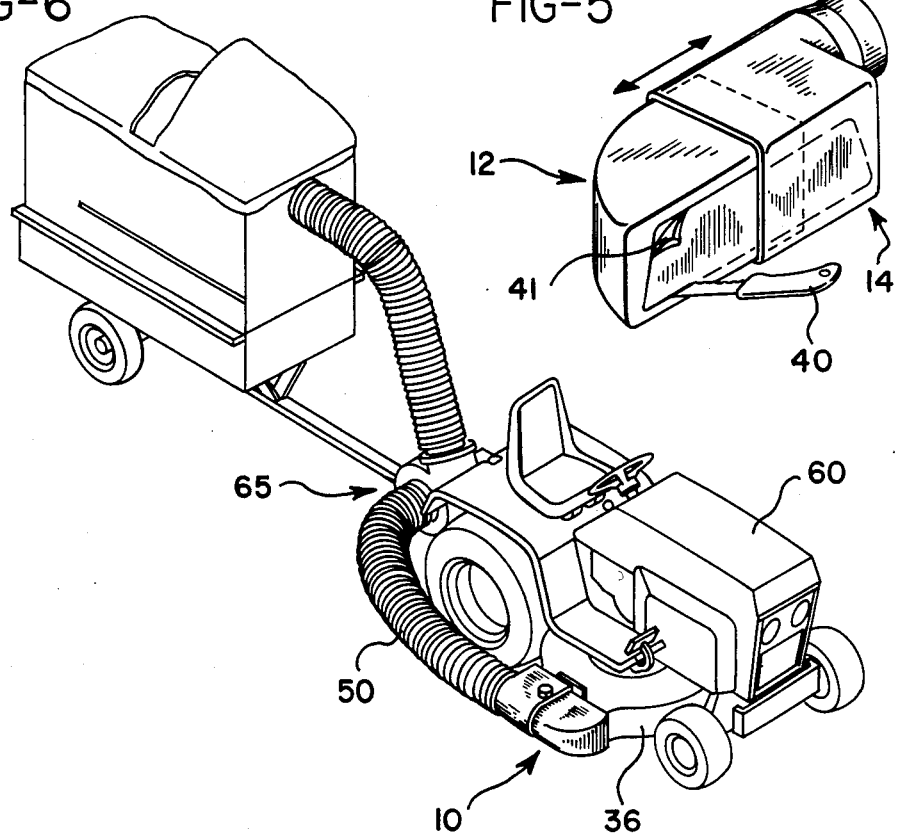
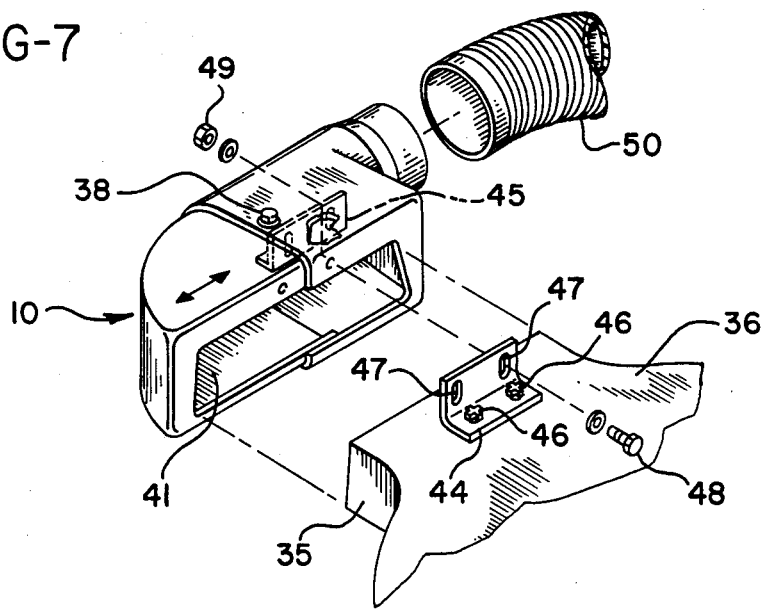

UNIVERSAL MOWER DECK BOOT

BACKGROUND OF THE INVENTION

This invention relates to a universal mower deck boot and more particularly to a universal boot for connection to the discharge chute of a power mower deck for delivery of the clippings and the like to a rearwardly extending flexible conduit, for ultimate disposition in a sweeper, bagger, or the like.

The invention more particularly relates to a universal mower discharge boot of the general type shown in U.S. Pat. No. 4,142,351 issued Mar. 6, 1979 to Neice et al. In this patent, a metallic boot is open at the bottom, and is provided with a side facing wall formed of trimmable or cuttable material so that the user may cut out an opening roughly corresponding to the size of the discharge boot on his particular mower deck/tractor combination, and then mount the metal part thereon. However, the boot as disclosed in patent '351 is not fully universal in that there is no provision for expanding or reducing the overall size or length of the boot to accommodate discharge chutes of varing dimensions. Additionally, the boot of patent '351 must be made to the largest anticipated dimension or size of the discharge chute. Since it is not otherwise adjustable in size, in many instances the boot interferes with the free floating or riding operation of the deck and/or otherwise encumbers the operation thereof or impedes it proper installation, in those instances where the boot is substantially longer in dimension than the width of the chute to which it is accommodated. Also, the boot bottom is open and does not fully enclose the chute.

SUMMARY OF THE INVENTION

This invention is directed to a universal mower deck boot which is particularly adapted for use on the discharge chute of a mower deck as connected or attached to a conventional garden tractor or the like, for collecting the clippings and for providing a discharge of the clippings to a hose which may in turn be directed or connected to a trailing bagger or the like. For this purpose, the universal boot is preferably made in two hollow pieces, including a forward piece or section and a rearward piece or section, one of which is adapted to telescope within the other for providing longitudinal or fore and aft adjustment of the overall length of the boot. Preferably, the boot is formed of a fairly rigid plastic material, such as a high density polyethylene, and is preferably rotationally molded so that the forward and rearward sections are formed with relatively high accuracy and constant wall thickness.

Each of the boot sections, as molded, is substantially closed except the rear section is provided with a generally tangentially arranged rearwardly directed outlet which is adapted to receive a flexible conduit, hose, or the like. The forward section has a forward curved wall to prevent the unit from engaging or being caught on obstacles, such as trees, fences, or other common yard obstacles.

Each of the boot sections is provided with a blank wall or face portion which is cut out, by the user, to accommodate the discharge end of the chute. Thereby, each of the boot sections may be considered as having a blank wall face which, when suitably cut out and combined together by telescoping sections to the desired telescopic longitudinal length, forms a common discharge chute-receiving opening.

An advantage or feature of the invention is that the discharge boot is universal in that it will fit most mower decks, and will fit those with either right-hand or left-hand discharge. It is relatively low cost to manufacture, and is easy to fit and use. It therefore provides ease of attachment of accessory equipment and permits such accessory equipment to be sold with assurance that the same may be adapted for use with a particular tractor and mower deck combination. For example, lawn vacuum equipment may thus be sold with a universal boot designed according to the present invention without the necessity of stocking a plurality of different boot designs merely for the purpose of tailoring the trailing lawn vacuum to a particular mower assembly.

Preferably, the discharge spout formed on the rear section is stepped so as to provide a cylindrical connection surface for either of the two popular hose sizes commonly in use, for example, 6" and 7".

It is accordingly an important object of the invention to provide a universal mower deck boot, as outlined above, which is formed in two relatively telescoping sections, and which may have a deck receiving opening cut out respectively in the sections for closely matching the boot to a mower deck.

A still further object of the invention is the provision of a boot, as outlined above, formed in two hollow telescopic sections, each of which has been molded of high impact strength plastic material such as by rotational molding, plastic injection, or the like.

A still further object of the invention is to provide a low cost universal boot which is pleasing in appearance and which may readily be adapted to be mounted to varying mower deck configurations, for receiving clippings therefrom.

A particular advantage of the invention is that except for the portion encompassing the discharge chute of the mower deck, the boot is fully closed along the top, the bottom and the sides. The suction of a trailing lawn vacuum will not be substantially dissipated by unwanted openings in the boot but will effectively receive all of the material from the discharge chute. The boot is closed along its bottom surface and will ride over humps, stumps and other debris commonly found in the yard without snagging or catching the boot.

These and other objects and advantages of the invention will be apparently from the following description, the accompanying drawings, and the appended claims.

BRIEF DESCRIPTION OF THE DRAWINGS

FIG. 1 is a perspective view, exploded, of a boot constructed according to this invention;

FIG. 2 is a perspective view of the boot of FIG. 1 in which the parts or sections are telescoped together, looking at the forward side thereof;

FIG. 3 is a top plan view of the boot, with a hose attached;

FIG. 4 is a longitudinal section through the boot taken generally along the line 4—4 of FIG. 3;

FIG. 5 is a perspective three-quarter frontal view of the boot sections assembled showing a typical opening in the boot sections in dotted outline form and showing the manner of cutting the blank face to form the discharge opening;

FIG. 6 is a perspective view of a trailer lawn vacuum/mower combination, showing the manner in which the boot may be applied to the mower deck of a riding tractor; and FIG. 7 is an exploded view showing the manner of attachment of the boot to a mower deck.

DESCRIPTION OF THE PREFERRED EMBODIMENT

Referring to the figures of the drawing which illustrate a preferred embodiment of the invention, a two-piece universal mower boot is illustrated generally at 10 in FIGS. 1 and 2 as including a hollow forward or front section 12 and a hollow back or rear section 14. The forward portion 12 is adapted to be adjustably telescoped within the rear portion 14, as shown in FIG. 2. The forward portion of the front boot section includes a flat top wall 16, a curved nose portion or front wall 17, a flat bottom 18 complementary to the top 16, and a flat front or inner blank wall 20.

The rear section 14 is also formed with a flat top 22, a curved outer wall 23 as best shown in FIG. 2, a flat bottom 24 complementary to the top 22, and an inner blank wall 25 which, together with the wall 20, provides means to receive the chute of a mower deck. The rear section 14 is open at its front to telescopically receive the forward or front section 12 therein, as shown for example in FIGS. 2 and 3. The rear section 14 is further provided with a generally cylindrical rearwardly directed spout 28 which is formed generally tangential to the outer wall 23 thereof and has a first enlarged portion 30 adapted to receive a 7" diameter hose and a second step-down portion 32 adapted to receive a 6" diameter hose. When a 7" diameter hose is used, the step-down portion 32 may be removed by cutting, if desired.

Each of the boot sections 12 and 14 is preferably formed of a high density polyethylene combined with ultraviolet stabilizers and produced by rotational molding, to provide uniform and accurate wall thicknesses, and to control the shape. When the sections are assembled, as best shown in FIGS. 2 and 3, the curved frontal or outer wall 17 helps to prevent the boot from being snagged or caught on stumps, fence posts, patio corners, or the like. The boot is substantially closed on four sides; the front and the rear, the top and the bottom.

The inner blank or wall faces 20 and 25 of the respective sections may now be suitably marked or scribed with the shape of the discharge chute such as the discharge end or chute 35 of the deck 36 (FIG. 7). The latter may conveniently be taken off of the chute by means of a cardboard template and the outline thereof transferred to the boot when the parts are telescoped together to an approximate position corresponding to the finished size of the boot, as shown for example in FIG. 5. In transferring the shape of the discharge chute outlet to the boot, it may be best to spread apart slightly the respective boot sections by ½" to 1" so that the boot is somewhat longer than the pattern, in other words, the pattern may comfortably fit on the blank faces of the boot, leaving an inch or so spacing at either end and assuring approximate ⅜" or more spacing from bottom of the boot. At this point, for convenience, the two sections may suitably be clamped together, such as by drilling a hole through the respective tops 16 and 22, at the overlapped portions, and the insertion therethrough of a keeper bolt and nut 38, as shown in FIG. 7. Using a knife, a small hand saw or the like, as illustrated at 40 in FIG. 5, the area of the respective blank faces corresponding to the pattern may now be removed to form a chute-receiving opening 41 which will comfortably receive the chute 35. If the chute has been provided with a deflector, it should normally be removed or lifted up out of the way as it will not be needed with this kind of installation.

The now assembled boot may be attached to the deck 36 by means of either one or two angle brackets 44, 45 as shown in FIG. 7, depending upon the match-up between the boot and the deck. The bracket 44 has one leg suitably fixed or attached to the top of the mower, by means of easily removable plastic headed screws or knobs 46, which permit the user to quickly mount and demount the bracket, as desired. The upwardly extending leg or face of the bracket may directly engage the adjacent face of the boot, or alternatively, may join with the upstanding face of the mating bracket 45. The attaching bolts 48 may either extend into the face of the boot, or into the vertically enlarged slots 47 of the respective brackets, and secured in place by nuts 49 which may be on the inside of the boot or behind the upward face of the bracket 45.

The opening which is defined by the spout 28 is more than sufficient to permit the insertion of a hand or wrench and pliers for the purpose of gripping the nuts 49 during tightening, when the second bracket is not used. A flexible conduit 50 is then assembled onto the spout 28 and suitably clamped in place. As previously noted, if the conduit 50 is of the 7" variety it is clamped to the larger diameter portion of the spout at 30, but if it is a smaller 6" diameter it is clamped to the portion 32.

A typical use of the universal mower deck boot of the invention is shown in FIG. 6 as attached to the deck 36 of a typical garden or lawn tractor 60, which is pulling a trailing lawn vacuum assembly 65. It will therefore be seen that this invention provides a versatile universal mower deck boot which is readily adapted for use with a wide variety of mower decks. It may be used with either right or left-hand discharge units, and an opening cut therein to accommodate the discharge chute. Thereafter the boot is substantially closed on all sides except for the opening to provide the most efficient gathering and withdrawal of lawn debris such as leaves, clippings or the like.

While the boot of the present invention has been shown with the forward section 12 telescoped within the rearward section 14, forming a relatively close fit, it is within the scope of the invention to reverse this arrangement, making the rear section 14 slightly smaller than the forward section so that the forward section telescopes over rather than within the section 14.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A two-piece hollow universal boot for mounting over the discharge chute of a mower deck, comprising:
    a body having a forward boot section and a rearward boot section;
    said forward section including a top, a bottom, a forward wall, and a blank side facing wall, and open at the rear adapted to be telescopically received in relation to said rearward boot section.
    said rearward boot section also having top and bottom walls, and a blank side facing wall, which blank wall is in alignment with said blank wall of said forward section when the same are received in telescopic relation, and having an open front, said rearward section being provided with a rearwardly directed spout which opens into the interior of said rearward section, said rearward section open front forming a cavity in common with the interior of said front section, said blank walls being knife cuttable to define therein a common deck chute receiving opening in said sections.

2. The boot of claim 1 in which said forward and rearward sections are rotationally molded of high density polyethylene and are formed with a substantial uniform wall thickness throughout.

3. A two-piece universal mower deck boot adapted to be mounted on the discharge chute of a mower, comprising:

a first hollow housing section, having three generally closed sides and a blank front wall portion and having an open end, a second hollow housing section adapted to be telescopically received on said first housing section enclosing the open end of said first housing section, said second housing section also having three generally closed sides and having a blank front wall portion which, when telescoped with said first section, forms a continuation of said blank wall portion of said first section, means on said second section defining an outlet spout adapted to be connected to an outlet conduit for delivery of clippings to a remote location, each of said blank wall portions being cuttable to define therein an opening corresponding to the outside dimensions of the discharge chute of the mower deck and being telescopically movable one relative to the other to form a relatively close fit with the sides of said mower deck, means retaining said sections in predetermined telescopic relation to each other and, means retaining said boot on a mower deck with the discharge chute extending thereunto through an opening cut in said blank wall portions.

* * * * *